United States Patent

[11] 3,595,027

[72] Inventor Andrew George Heron
 Stocksfield, England
[21] Appl. No. 840,309
[22] Filed July 9, 1969
[45] Patented July 27, 1971
[73] Assignee Heron Electrical Devices Limited
[32] Priority Aug. 15, 1968
[33] Great Britain
[31] 38992/68

[54] STARTING CIRCUIT FOR ELECTRIC MOTOR
 3 Claims, 2 Drawing Figs.
[52] U.S. Cl. ................................................. 62/158,
 62/196, 62/226
[51] Int. Cl. .................................................. F25b 41/00
[50] Field of Search............................................. 62/158,
 196, 226

[56] References Cited
UNITED STATES PATENTS

| | | | |
|---|---|---|---|
| 1,786,791 | 12/1930 | Terry........................... | 62/196 |
| 1,870,458 | 8/1932 | Kenney ........................ | 62/196 |
| 2,007,388 | 7/1935 | Tarleton....................... | 62/196 X |
| 2,069,767 | 2/1937 | McCormick ................. | 62/196 X |
| 2,165,741 | 7/1939 | Wolfert........................ | 62/196 |

Primary Examiner—Meyer Perlin
Attorney—Sughrue, Rothwell, Mion, Zinn & Macpeak

ABSTRACT: A circuit including a circuit breaker for starting an electric motor driving a fluid pump with output and return pipes, comprising an initiating electric contact, a short circuit pipe connected between said output and return pipes, an electromagnetic valve in said short circuit pipe adapted to open on operation of said initiating contact and close when said motor has started, and a fluid-operated contact in series with said circuit breaker such that said breaker cannot close until the flow past said flow-operated contact is reduced to a predetermined value.

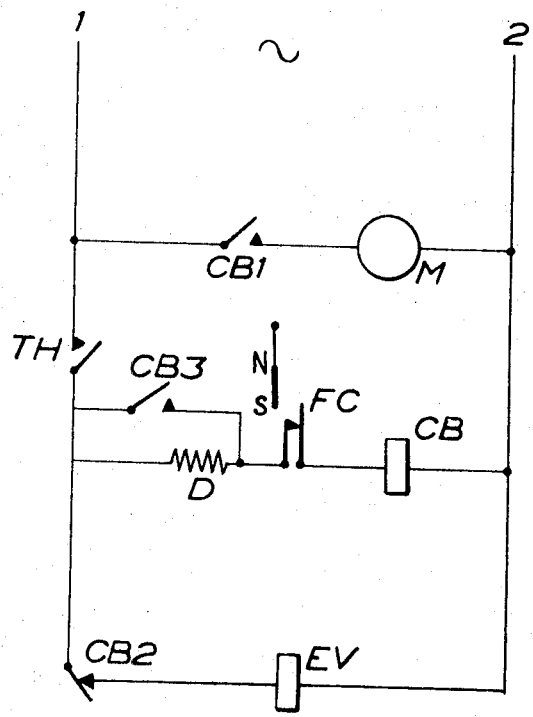
-FIG.1-
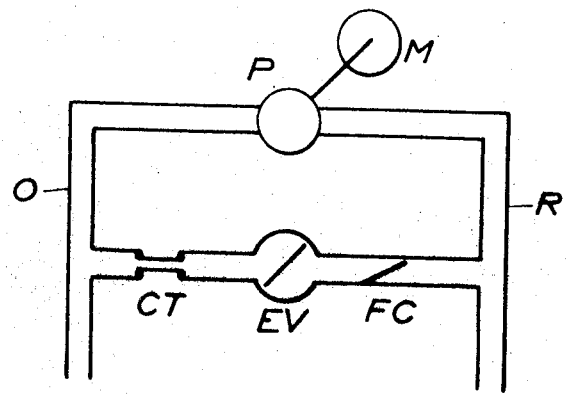
-FIG.2-

STARTING CIRCUIT FOR ELECTRIC MOTOR

It is known that difficulties exist in connection with starting an electrical motor, more particularly one energized from alternating current, under full load. These difficulties include provision of a high starting current which may be of low power factor, the creation of surges on the power mains, and the need to provide large cables, especially if the motor is at the end of a long feeder. In the latter case, the voltage drop produced may be so large as to fail to start the motor, in which case the machine can burn out.

Such a condition is most often met in connection with starting a motor driving a piston-type compressor as used, for example, in connection with a refrigerator installation or an air compressor. The object of the present invention is to provide means for starting an electric motor in such an installation under low or zero load, then applying the load when the motor is running.

Taking the case of a motor running a refrigeration pump, it is known that the pump, under normal conditions, always has a high pressure on the output side and a low pressure on the return side, so that if the pump motor is switched on, it has to start under full load or back pressure.

We arrange a capillary tube short circuit between the output and return pipes of the pump, with an electromagnetically operated valve therein. We also insert a fluid-flow-operated flap in the said pipe in series with the valve, the flap having a magnet thereon which cooperates with a reed switch outside the pipe. The flap switch may be a differential-pressure-actuated device. The method of operation is as follows.

When the temperature of the cooled space rises to a value at which further cooling is required, a thermostat contact closes and opens the electromagnetic valve. This allows a rapid flow of refrigerant gas to take place through the valve, thus operating the flap, which opens its reed contact. This contact is in series with the coil of the main motor contactor, which therefore does not operate. After a short time, the pressure between the outlet and return pipes equalizes, the gas flow drops, and the flap falls, closing its reed contact. This allows the circuit breaker to operate and start the compressor motor under substantially zero load.

A contact of the circuit breaker breaks the circuit of the magnetic valve which closes, and the motor runs the pump until sufficient cooling has taken place to open the thermostat contact. This releases the circuit breaker, and the cycle is ready for repetition.

To ensure that the electromagnetic valve operates before the circuit breaker, a delay may be incorporated in the breaker circuit.

According to out invention, a circuit for starting an electric motor driving a fluid pump with output and return pipes comprises an initiating contact such as a thermostat, a short circuit pipe connected between the output and return pipes, an electromagnetic valve in said short circuit pipe, adapted to open an operation of the initiating contact and close when the motor has started, and a flow or pressure-differential-operated contact in series with a motor-start circuit breaker such that the latter cannot operate until the pressure on both sides of the pump is substantially equalized.

Reference should now be made to the accompanying drawings in which:

FIG. 1 is an electrical circuit, and

FIG. 2 shows the pipe arrangements of a refrigerator to which the circuit of FIG. 1 may be applied.

From FIG. 1 it can be seen that AC supply leads 1 and 2 are connectable to a motor M, a circuit breaker CB, and an electromagnetic valve EV. There is also a thermostat TH which closes when the temperature of a refrigerated container rises above a predetermined value, and a flap contact FC in series with the circuit breaker CB, the flap contact being operated as subsequently described below. A delay device D is inserted in series with the circuit breaker CB, the delay being, for example, a brimister i.e. a resistor with a negative resistance-temperature characteristic. The circuit breaker CB operates normally open contacts $CB_1$, in series with the motor M, and $CB_3$, in parallel with the delay device D, as well as normally closed contact $CB_2$ in series with the electromagnetic valve EV.

The motor M drives a pump P as shown in FIG. 2, and the pump is connected to output and return pipes O and R. Under normal conditions the output pipe is always at high pressure and the return pipe at low pressure. Between the two pipes there is a further short circuit pipe including a capillary control tube CT, and the valve portion of the electromagnetic valve EV. There is a flap of the flap contact FC also in the short circuit tube, the flap being deflected by any gas movement in the said pipe.

The operation of the device shown is as follows.

Assuming that the motor and pump are stationary, and the thermostat contact TH open, then the refrigerated container in which the thermostat is located is at a suitable operating temperature. No refrigerating action takes place.

When the temperature rises above a predetermined limit, the thermostat TH closes its contact and this energizes the electromagnetic valve EV via contact CB2. The delay device D prevents operation of the circuit breaker CB at this moment.

Operation of the electromagnetic valve EV opens a restricted short circuit from the output to the return pipe of the pump P FIG. 2, and the rush of gas through the valve EV moves the flap contact FC so that it opens its associated contact. This condition persists until pressure in the output and return pipes of the installation are substantially equal, when the flow of gas is reduced and the flap FC falls. This allows the contact of FC. FIG. 1, to close.

Since the thermostat contact TH is still closed, current passes through the brimister D, closed contact FC and the circuit breaker CB, and after a delay during the heating-up time of the brimister D, circuit breaker CB operates to close contacts $CB_1$ and $CB_3$ and open contact $CB_2$. Its contact CB1 starts up the motor M which now drives the pump at substantially zero load. The contact CB2 opens the circuit of the valve EV so that the short circuit between the output and return pipes is closed, and contact CB3 short circuits the brimister, thus ensuring full and complete operation of the circuit breaker CB.

The motor now runs continuously, causing refrigeration to take place in the cooled container. This process continues until the thermostat TH opens its contact when the predetermined temperature of the container has been reached. This releases the circuit breaker CB, which releases its three contacts, thus shutting down the motor. The valve EV does not open again since the thermostat TH has opened its own contact. The circuit remains in this condition until the cooled container warms up to the predetermined temperature when TH closes once more. Thereafter the cycle is repeated.

Although the flap contact FC has been shown as operated by the gas movement, it may be a pressure-differential-operated device, in which case connections to the device will be necessary from both sides of the valve EV.

The rate of pressure equalization between the output and return pipes may be varied by varying the size of the capillary tube CT, and the circuit may be applied to a device other than a refrigerator, such as an air compressor, in which latter case a nonreturn valve would be necessary in the output pipe at the point X as shown in FIG. 2. A similar arrangement could be applied to a liquid pressure accumulator actuated by a motor driven pump.

We claim:

1. A circuit including a circuit breaker for starting an electric motor driving a fluid pump with output and return pipes, comprising; an initiating electric contact, a short circuit pipe connected between said output and return pipes, an electromagnetic valve in said short circuit pipe, responsive to the activation of said initiating contact, for allowing fluid to flow through said short circuit pipe, a flow-operated contact, responsive to the flow of fluid in said short circuit pipe, electrically connected in series with said circuit breaker for activating said circuit breaker when the flow of fluid passing the flow-operated contact is reduced to a predetermined value, first contact means, responsive to the activation of said circuit breaker for permitting starting current to flow to said motor, and second contact means responsive to the activation of said circuit breaker for deenergizing said electromagnetic valve to thereby block the further flow of fluid in said short circuit pipe.

2. A circuit as recited in claim 1 as applied to a refrigerator, wherein said motor operates a compressor pump which pumps a compressible fluid in a refrigerant circuit, said initiating contact is a thermostat, said short circuit pipe has a capillary portion, and said flow-operated contact is actuated by the rate of flow of gas past said electromagnetic valve.

3. A circuit as recited in claim 1 incorporating a delay device in series with said circuit breaker, and a make contact of said circuit breaker in parallel with said delay device.